July 14, 1953  R. P. STURGIS  2,645,506
PIPE FLANGE CONNECTION
Filed Feb. 9, 1951
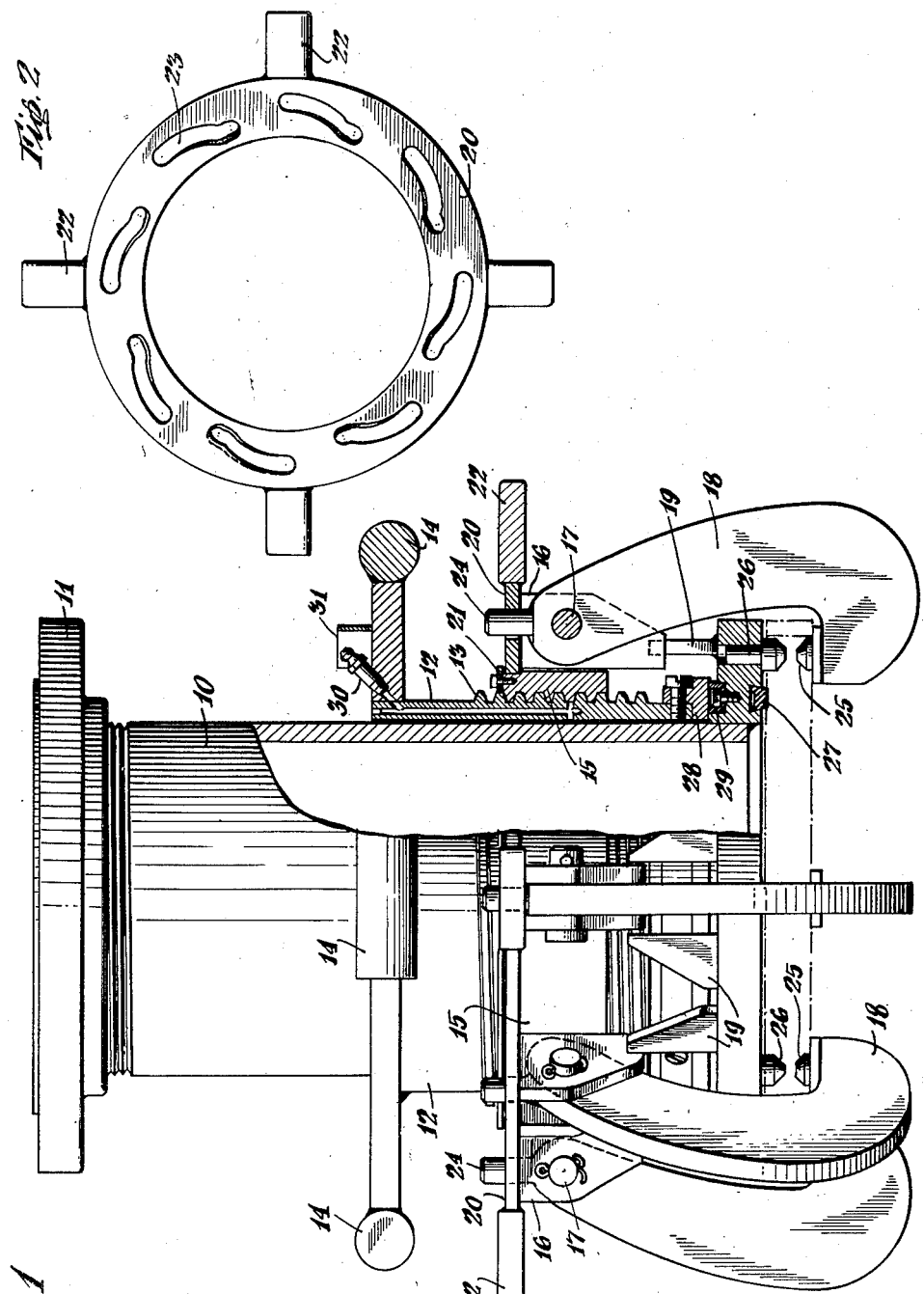
INVENTOR.
Robert P. Sturgis
BY
Oswald G. Hayes
ATTORNEY

Patented July 14, 1953

2,645,506

UNITED STATES PATENT OFFICE 2,645,506

PIPE FLANGE CONNECTION

Robert P. Sturgis, Woodbury, N. J., assignor to Socony-Vacuum Oil Company, Incorporated, a corporation of New York Application February 9, 1951, Serial No. 210,165

2 Claims. (Cl. 285—129)

This invention pertains to a device for securely and rapidly coupling a conduit to another conduit having a flanged end fitting.

It is common practice to couple conduit lines, particularly pipes and hoses of four inch diameter and upwards by means of flanged ends. The flanges provide surfaces normal to the axes of the conduits adapted to clamp between them a suitable gasket. The flanges are drilled in standard fashion to receive bolts which may be passed through both flanges and thus clamp the gasket when nuts are drawn tight on the bolts. This forms an excellent, liquid-tight seal well adapted for use in oil lines and the like.

For certain purposes, the time consumed in making the joint is objectionable. This is particularly true in instances in which the joint is to be in use for only a few hours. For example, flanged joints are used in coupling the discharge lines of pumps on tankers to shore installation lines for discharging an oil cargo to shore tankage. The high capacity pumps of modern tankers are capable of discharging the entire cargo in a few hours and the hour or more required to make each flanged connection between a ship line and a short line constitute a substantial portion of the time a ship is required to remain at the dock.

The principal object of this invention is to provide a flanged end for a conduit adapted to be rapidly coupled to a standard flanged pipe end and provide a liquid tight seal at the resultant joint. With this and other objects in view, reference is made to the detailed description of a specific embodiment of the invention set out below, and to the annexed drawings wherein:

Figure 1 is an assembly view, partially in section, of a preferred embodiment of the invention; and Figure 2 is a detail view of the cam plate forming part of the assembly shown in Figure 1.

The flange coupling of this invention includes a flanged spool 10 which may be suitably attached at the end remote from the flange to a rigid pipe or a flexible hose, as by means of the threaded flange 11. A collar 12 about the flanged spool 10 has threads 13 formed in its outer surface on the portion adjacent the flange and at the other end is fitted with lugs 14 to which hammer blows may be applied for tightening the flange connection in a manner to be presently described.

A spider ring 15 about the collar 12 is formed with internal threads engaging the external threads 13 on the collar 12. Integral with the spider ring 15 are hinge brackets 16, drilled to receive hinge pins 17, forming pivots for the mounting of dogs 18 which are formed and mounted to swing into the position shown in Figure 1. Clips 19 are rigidly mounted on the back of the flange of the spool 10, to straddle each pair of hinge brackets 16 on the spider ring 15, and inhibit rotation of the spider ring.

Cam plate 20 is mounted for free rotation in a groove formed by a recess of the spider ring 15 on the end thereof remote from the flange of the spool 10 and a retainer ring 21 which keeps the cam plate 20 in operative position.

The cam plate 20 is formed with handles 22 by which the same may be rotated about the spider ring 15. Slots 23 are cut in the cam plate 20 at an acute angle to the radius of said cam plate and engage pins 24 on the top of dogs 18 to pivot the latter about hinge pins 17 when cam plate 20 is rotated.

Each of the dogs 18 is provided with a projection 25 and matching projections are provided in the opposing face of the flange of spool 10 by pins 26 securely mounted in holes bored in the flange. The dogs 18 and matching pins 26 are spaced about the flange of spool 10 in a manner to match the bolt holes of a standard pipe flange, namely at radial angles of 45°, providing a total of eight dogs 18 and matching pins 26. A gasket 27, for example rubber, is provided in a groove in the face of the flange of spool 10 to insure a liquid tight seal against a pipe flange.

The thrust of tightening the dogs 18 against a pipe flange in the manner described below is taken by bearing collar 28 secured to collar 12 and bearing ring 29 secured to the inner face of the flange on spool 10. Provision for lubrication is made by a grease fitting 30, protected by guard 31, and communicating with a bore in collar 12 as shown.

In using the pipe flange connection of this invention, the cam plate 20 is rotated to throw the ends of the dogs outwardly. In the view of Figure 1, the cam plate 20 would be rotated to the right; the edges of slots 23 engaging lugs 24 to draw the lugs inwardly, thus causing the other ends of the dogs to move outwardly. A pipe flange, for example on the end of a flexible hose connected to the discharge of a tanker's pumps, is then placed against gasket 27 with the heads of pins 26 resting in the bolt holes of the pipe flange to be connected. Cam plate 20 is then operated in the reverse direction to swing dogs 18 into position against the flange of the connected line with projections 25 in registry with the bolt holes of the latter flange. Collar 12 is rotated by hand in a direction to draw spider ring 15 away from the flange, thus pulling the adjacent flanges of the two lines against the gasket. A few smart blows with a mallet on one of the lugs 14 serves to tighten the flanges against the gasket to form a liquid tight seal between the two lines. The reverse of the recited sequence will release the joint in a manner which is readily apparent.

I claim:

1. A pipe flange connection comprising a pipe, an outwardly extending flange integral with the end of said pipe, an exteriorly threaded collar about said pipe adjacent said flange, a spider having internal threads about and engaging the exterior threads of said collar, a plurality of L-shaped dogs each mounted at one end on said spider for pivotal movement about an axis tangent to said spider, the leg of said dogs remote from the point of attachment aforesaid being adapted to move into position parallel to the face of said flange and engage a corresponding flange member to be connected thereto, a lug extending from each of said dogs in the direction opposite from said leg thereof, a cam plate rotatably mounted on said spider adjacent the side of said spider remote from said flange, said cam plate having slots therein at an acute angle to radii of said cam plate and adapted to engage said lugs, means to inhibit rotation of said spider about said pipe and means to induce rotary movement of said collar about said pipe.

2. A device as defined in claim 1 having projections extending from the said legs of said dogs toward said flange when in the position aforesaid, and matching projections extending from the face of said flange.

ROBERT P. STURGIS.

References Cited in the file of this patent

UNITED STATES PATENTS

| Number | Name | Date |
|---|---|---|
| 382,597 | Emerson | May 8, 1888 |
| 1,910,706 | Malzard | May 23, 1933 |
| 2,536,602 | Goett | Jan. 2, 1951 |